Jan. 17, 1950     O. E. WILLIAMS     2,494,850
NONSKID DEVICE
Filed April 23, 1947     2 Sheets-Sheet 1
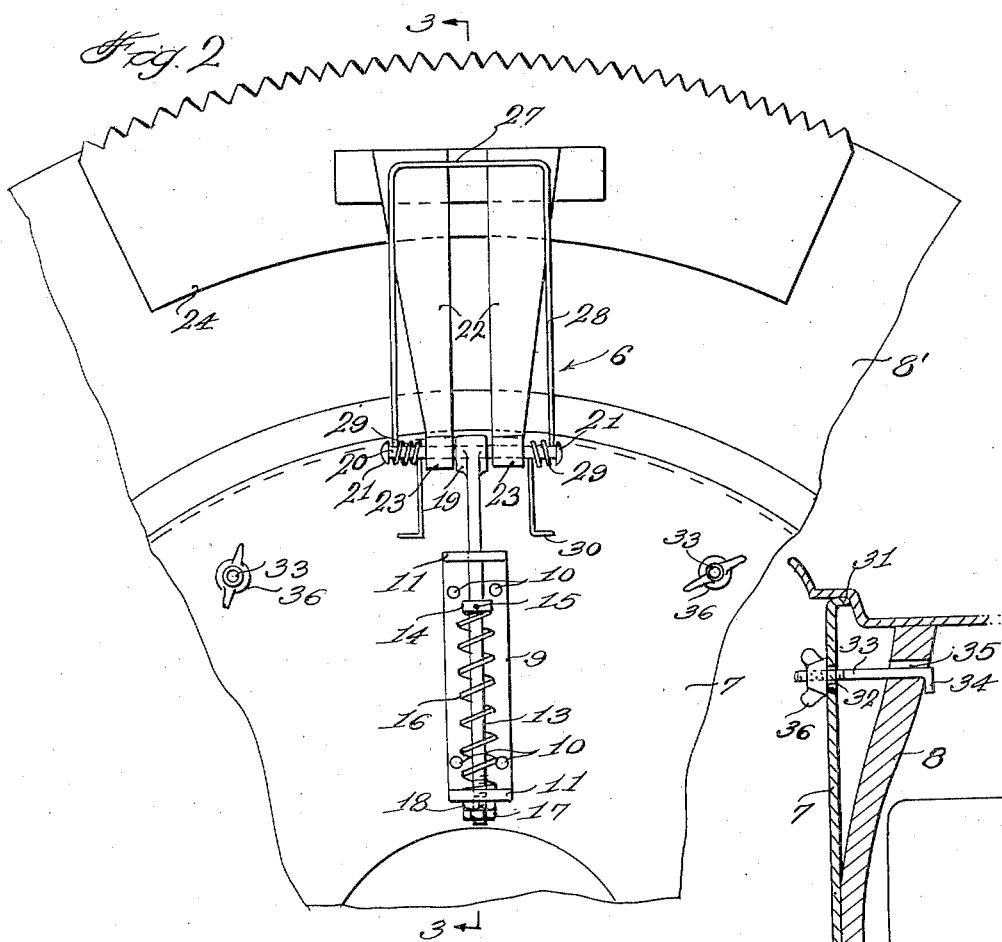
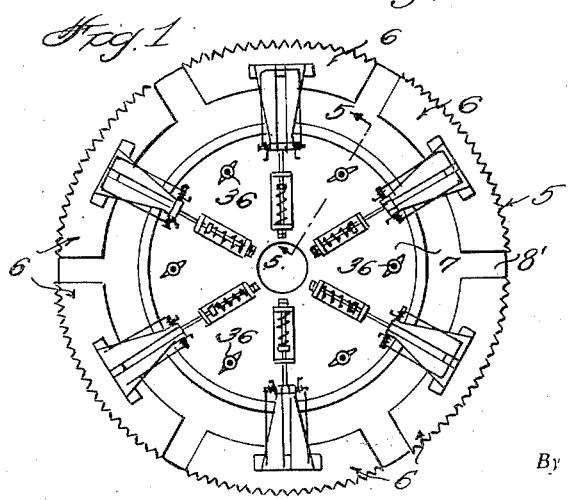
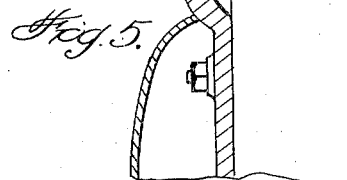
Inventor
Owen E. Williams
By Randolph & Beavers
Attorneys

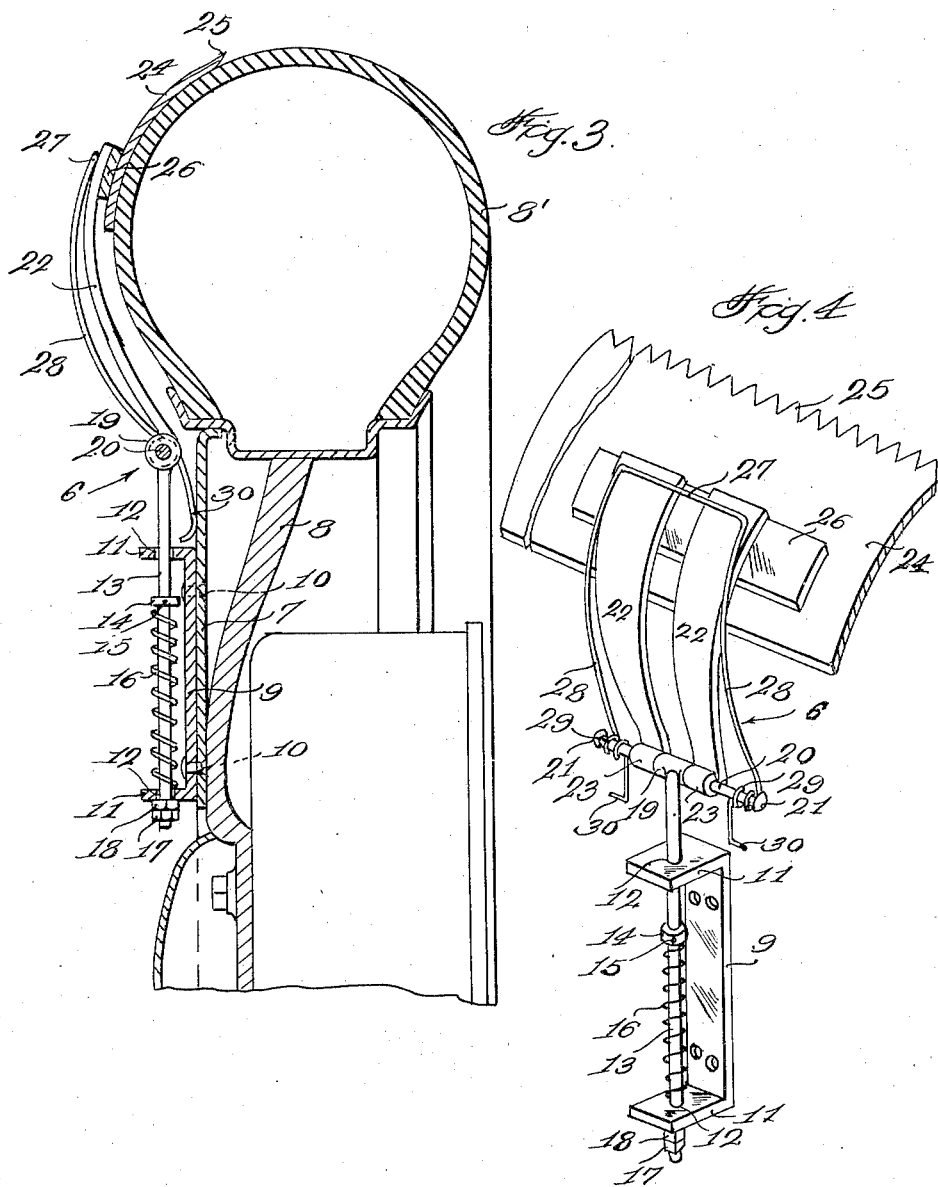

Patented Jan. 17, 1950

2,494,850

UNITED STATES PATENT OFFICE 2,494,850

NONSKID DEVICE

Owen E. Williams, Oshkosh, Wis.

Application April 23, 1947, Serial No. 743,439

5 Claims. (Cl. 152—216)

This invention relates to a non-skid and traction device for use with pneumatic tires of motor vehicles and has particular reference to a traction member adapted to be demountably supported on a vehicle wheel and yieldably disposed with a surface-engaging portion thereof adjacent the tread portion of a pneumatic tire of the vehicle so that said surface engaging portion will engage the surface, engaged by the tire, to provide additional traction and to prevent skidding.

Another object of the invention is to provide a device of the aforedescribed character of extremely simple construction capable of being readily applied to or removed from a vehicle wheel without requiring jacking up the wheel and which is entirely disposed on the external side thereof, thus eliminating reaching in behind the tire and wheel or getting under the vehicle on which the wheel is mounted.

Still a further object of the invention is to provide an anti-skid device formed of a plurality of individual sections or units, capable of being individually applied or removed and each of which is yieldably supported with respect to the pneumatic tire to yield therewith in case of partial deflation of the tire or in passing over obstructions.

Still a further object of the invention is to provide an anti-skid device which is yieldably urged to rock toward the tire so as to engage substantially flush against the outer side wall thereof.

Still another object of the invention is to provide an anti-skid device which will function effectively to prevent lateral skidding of a vehicle equipped with the device.

Various other objects and advantages of the invention will hereinafter become more fully apparent from the following description of the drawings, illustrating a preferred embodiment thereof, and wherein:

Figure 1 is a side elevational view, looking toward the outer side of a vehicle wheel equipped with a pneumatic tire and showing the anti-skid device applied thereto;

Figure 2 is an enlarged fragmentary side elevational view looking toward the outer side of the wheel and tire and showing one unit of the device in an applied position;

Figure 3 is a radial sectional view taken substantially along a plane as indicated by the line 3—3 of Figure 2;

Figure 4 is a perspective view of one unit of the anti-skid device shown detached, and Figure 5 is an enlarged sectional view taken substantially along a plane as indicated by the line 5—5 of Figure 1.

Referring more specifically to the drawings, the anti-skid device in its entirety, as illustrated in Figure 1, is designated generally 5 and comprises a plurality of individual anti-skid units, each designated generally 6, and each of which is independently and detachably mounted on the outer side of a motor vehicle wheel 8, equipped with conventional pneumatic tire 8' by means of an annular plate 7 which is detachably fastened to the wheel 8.

Each anti-skid unit 6, as best illustrated in Figures 2, 3 and 4, includes a mounting bracket 9 comprising an elongated bar which is secured to the outer side of the plate 7 and substantially radially thereof by means of suitable fastenings 10, such as rivets. The bar or mounting bracket 9 is provided with outturned ends 11 having aligned openings 12 for reciprocably and detachably receiving a rod 13 which extends loosely therethrough. The rod 13 is provided with an adjustable and detachable collar 14 which is adjustably secured thereto by a set screw 15 and which is disposed between the outturned bracket ends 11 to provide a perch for one end of an expansion coil spring 16 which is disposed on the rod 13 and the opposite end of which abuts against the innermost bracket end 11. The inner, shank end of the rod 13 is threaded to receive a nut 17 which is adjustably disposed thereon, inwardly of the inner bracket end 11 and a washer 18 is carried by the rod 13, between said bracket end and the nut 17. If desired, the rod 13 may be threaded throughout a substantial portion of its length and in which case a nut may be substituted for the collar 14 and set screw 15.

The rod 13 is provided at its opposite, outer end with a head 19 through which extends an elongated pin 20. The pin 20 is anchored intermediate of its ends on the head 19 and is provided with corresponding headed ends 21 which are spaced a considerable distance from the head 19 to provide shank portions on either side of said head 19. A pair of corresponding supporting arms 22 are pivotally mounted at corresponding ends thereof on the pin 20, one on either side of the head 19; said arms 22 preferably being formed of strap iron and having transversely disposed sleeve portions 23 at corresponding ends thereof for turnably engaging the pin 20. An elongated, substantially rigid plate 24 formed of a suitable metal, is supported by the arms 20 against a portion of the outer side wall of the tire 8' and against an adjacent portion of the tire tread. As best seen in Figure 2, the plate 24 is disposed with its longitudinal axis positioned circumferentially of the tire 8' and the longitudinal edges thereof are bowed substantially concentric of the wheel and tire. The plate 24 is likewise arcuate in cross section to fit substantially flush against the side wall and tread portion of the tire 8', as seen in Figure 3, except for the outer convex edge thereof which is flared outwardly and provided with teeth 25. A strip of metal 26, preferably strap iron, is secured to the outer side of the plate 24 in any suitable manner and is disposed intermediate of the ends of said plate and longitudinally thereof. The opposite, outer ends of the arms 22 are secured in any suitable manner to the strip 26, and as best seen in Figure 3, said arms 22 are bowed outwardly in directions longitudinally thereof for spacing said arms from the outer side wall of the tire 8'.

A substantially inverted U-shaped spring 27 is provided with corresponding legs 28 having corresponding coiled portions 29 intermediate of the ends of said legs and which are disposed transversely thereof for loosely engaging the pin 20 between the sleeve portions 23 and the heads 21. The terminals or free ends 30 of the legs 28 project from the coiled portions 29 and bear against the wheel 8 for urging the intermediate or bight portion of the spring 27 inwardly or toward the tire 8'. Said intermediate portion of the spring 27 bears against the outer ends of the arms 22 for yieldably urging said arms and the plate 24 toward the tire 8' for yieldably retaining said plate in substantially flush engagement therewith, as seen in Figure 3.

The toothed or serrated edge 25 of each of the anti-skid units 6 is yieldably retained by the springs 16 and 27 thereof in a position for engaging a surface engaged by the adjacent tread portion of the tire 8' and said edges 25 thus provide an augmenting traction means for affording additional traction on snow or on ice. The springs 28 will permit the arms 22 and plates 24, carried thereby to yield outwardly in case of partial deflation of the tire 8' for adjusting the position of the plates 24 relatively thereto and the springs 16 will permit the rods 13 to yield inwardly of the wheel and tire to likewise adjust the positions of the edges 25 with respect to the tread portion of the tire and so that said edges will contact the surface, not shown, engaged by the tire with the proper amount of pressure to afford the additional amount of traction required. The nut 17 can be adjusted on the inner end of the rod 13 of each unit 6 for advancing or retracting the serrated edge 25 relatively to the tire tread.

The individual units 6 can be demounted from their supporting brackets 9 by removing the nut and washer 18 and loosening the set screw 15 so that the rod 13 can be withdrawn outwardly from the bracket 9 for demounting all parts of the unit except the bracket 9.

Figure 1 shows six of the units 6 applied to the wheel 8, but it will be readily apparent that a lesser number may be utilized.

In addition to affording traction for the tire 8' it will be readily apparent that the serrated edges 25 will cooperate to prevent lateral skidding of the tire 8' of a vehicle equipped with the anti-skid device 5 on the two rear wheels thereof, for example.

The plate 7, as seen in Figure 5, is annular in shape to fit around the hub cap of the wheel 8 and has an inturned flange 31 at its periphery which bears against a portion of the rim of the wheel 8. The annular plate 7 is provided with circumferentially spaced openings 32 for receiving the threaded shanks of bolts 33 which extend outwardly therethrough. The bolts 33 are provided with angularly disposed heads 34 and said bolts are adapted to be extended inwardly through conventional openings 35 in the disk portion of the wheel 8 and turned so that the angular heads 34 thereof will engage the inner side of the disk portion of the wheel, after which wing nuts, attached to the outer ends of the bolts 33, as seen at 36, are tightened against the outer side of the plate 7 for securing the plate and the bolts to the wheel 8 for demountably applying the anti-skid device 5.

Various modifications and changes are contemplated and may obviously be resorted to, without departing from the spirit or scope of the invention as hereinafter defined by the appended claims.

I claim as my invention:

1. An anti-skid device for wheels equipped with pneumatic tires, comprising a plurality of individual anti-skid units demountably supported on the outer side of a vehicle wheel, each of said units including means for reciprocally supporting the unit relatively to the wheel for radial movement relatively thereto, each unit including an elongated traction element adapted to be disposed against a portion of the side wall of the tire and extending circumferentially thereof and with a portion thereof positioned to engage the surface engaged by the tire tread, spring means for urging the unit outwardly of the wheel, means for pivotally mounting said traction element for swinging movement in a direction laterally of and away from said side wall of the tire, and spring means for yieldably retaining the traction element against the tire.

2. In an anti-skid device for vehicle wheels equipped with pneumatic tires, said anti-skid device comprising a plurality of independent anti-skid units mounted on the outer side of the wheel in circumferentially spaced relationship relatively to one another, a mounting plate for supporting the units and demountably supported on the wheel, each of said units including a mounting bracket attached to the outer side of the mounting plate and disposed radially thereof, a rod reciprocally and detachably mounted in each mounting bracket, a supporting arm pivotally supported on the outer end of each rod for swinging movement in a direction laterally of the tire and wheel, and a traction plate provided with a surface engaging portion and supported by each of said arms and adapted to be positioned against a portion of the outer side of the tire and the adjacent tread portion thereof.

3. An anti-skid device as in claim 2, and adjustable resilient means for yieldably urging the rod of each unit radially outwardly of the wheel.

4. An anti-skid device as in claim 2, adjustable resilient means for yieldably urging the rod of each unit radially outwardly of the wheel, and means for adjusting the extent of outward movement of the rod relatively to its mounting bracket.

5. An anti-skid device as in claim 2, adjustable resilient means for yieldably urging the rod of each unit radially outwardly of the wheel, means for adjusting the extent of outward movement of each rod relatively to its mounting bracket, and spring means for yieldably retaining each plate in engagement with the tire.

OWEN E. WILLIAMS.

REFERENCES CITED

The following references are of record in the file of this patent:

UNITED STATES PATENTS

| Number | Name | Date |
|---|---|---|
| 1,105,374 | Penno | July 28, 1914 |
| 1,257,145 | Stern | Feb. 19, 1918 |
| 1,388,066 | Schoenborn | Aug. 16, 1921 |
| 1,593,129 | Matthews | July 20, 1926 |